United States Patent [19]
Libutti et al.

[11] Patent Number: 5,585,171
[45] Date of Patent: Dec. 17, 1996

[54] ADSORBENT FILTER BED WITH PLIANT AND STIFF MEMBERS

[75] Inventors: Bruce L. Libutti, Teaneck, N.J.; Joseph M. Ragosta, Elkton, Md.

[73] Assignee: Graver Chemical, Glasgow, Del.

[21] Appl. No.: 259,260

[22] Filed: Jun. 14, 1994

Related U.S. Application Data

[63] Continuation-in-part of Ser. No. 2,957, Jan. 11, 1993, Pat. No. 5,346,624.

[51] Int. Cl.$^6$ ...................................................... D04H 1/58
[52] U.S. Cl. ........................... 428/288; 428/283; 428/297; 428/323; 428/325
[58] Field of Search ................................... 428/283, 297, 428/298, 288, 323, 325

[56]  References Cited

U.S. PATENT DOCUMENTS

| | | | |
|---|---|---|---|
| 4,231,768 | 11/1980 | Seibert et al. | 55/179 |
| 4,238,334 | 12/1980 | Halbfoster | 210/679 |
| 4,511,473 | 4/1985 | Hou | 210/348 |
| 4,643,182 | 2/1987 | Klein | 128/201.25 |

*Primary Examiner*—James J. Bell
*Attorney, Agent, or Firm*—Dressler, Goldsmith, Milnamow & Katz, Ltd.

[57]  ABSTRACT

A filter bed for removing impurities from a liquid stream is described. The filter bed comprises a mat of pliant fibers and relatively stiff fibers. The filter bed may additionally include adsorbent particles. The filter bed can provide desirable filtration efficiencies while exhibiting relatively low operating differentials. A method for separating impurities from a liquid which employs the filter bed is also described.

13 Claims, 2 Drawing Sheets

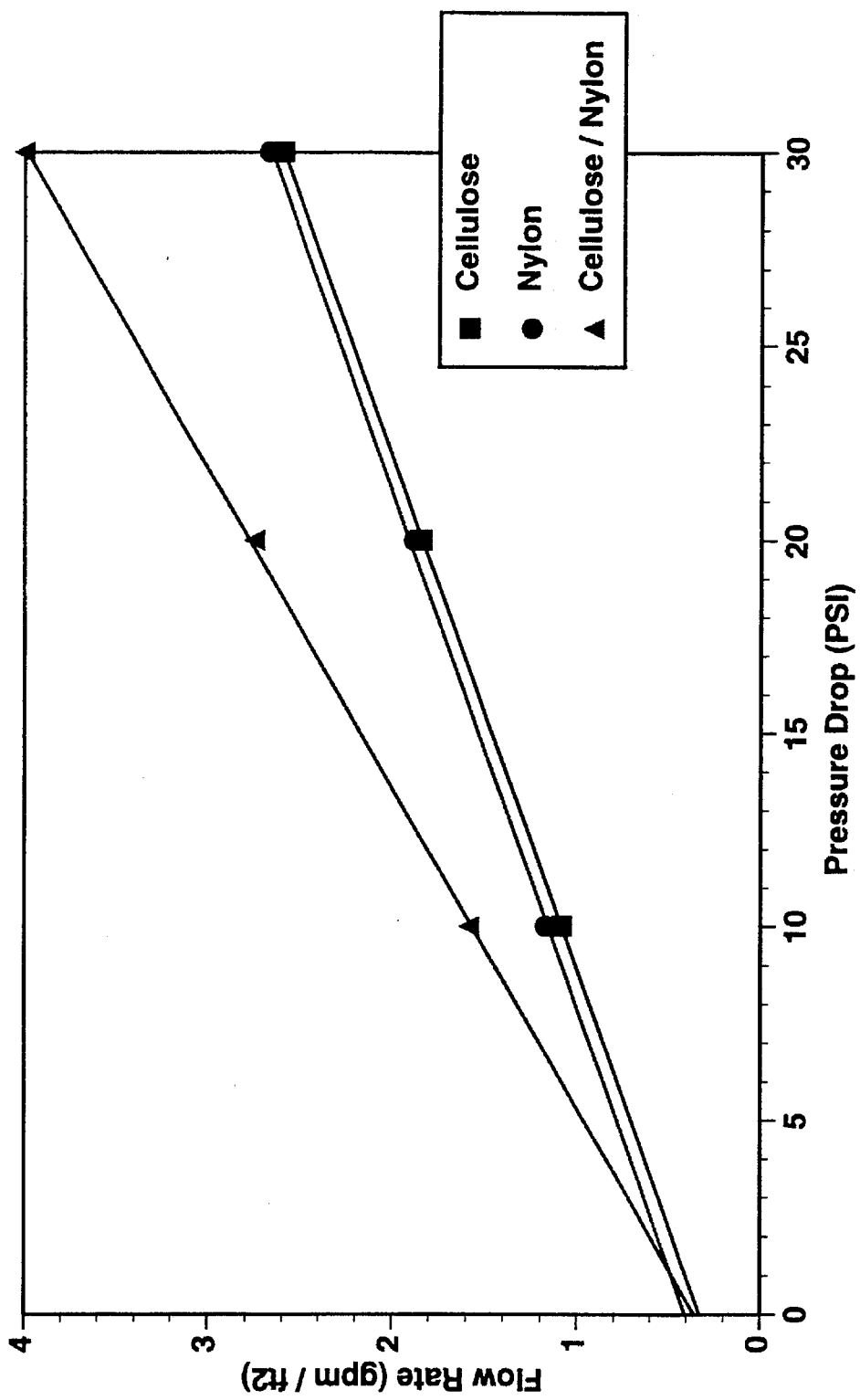

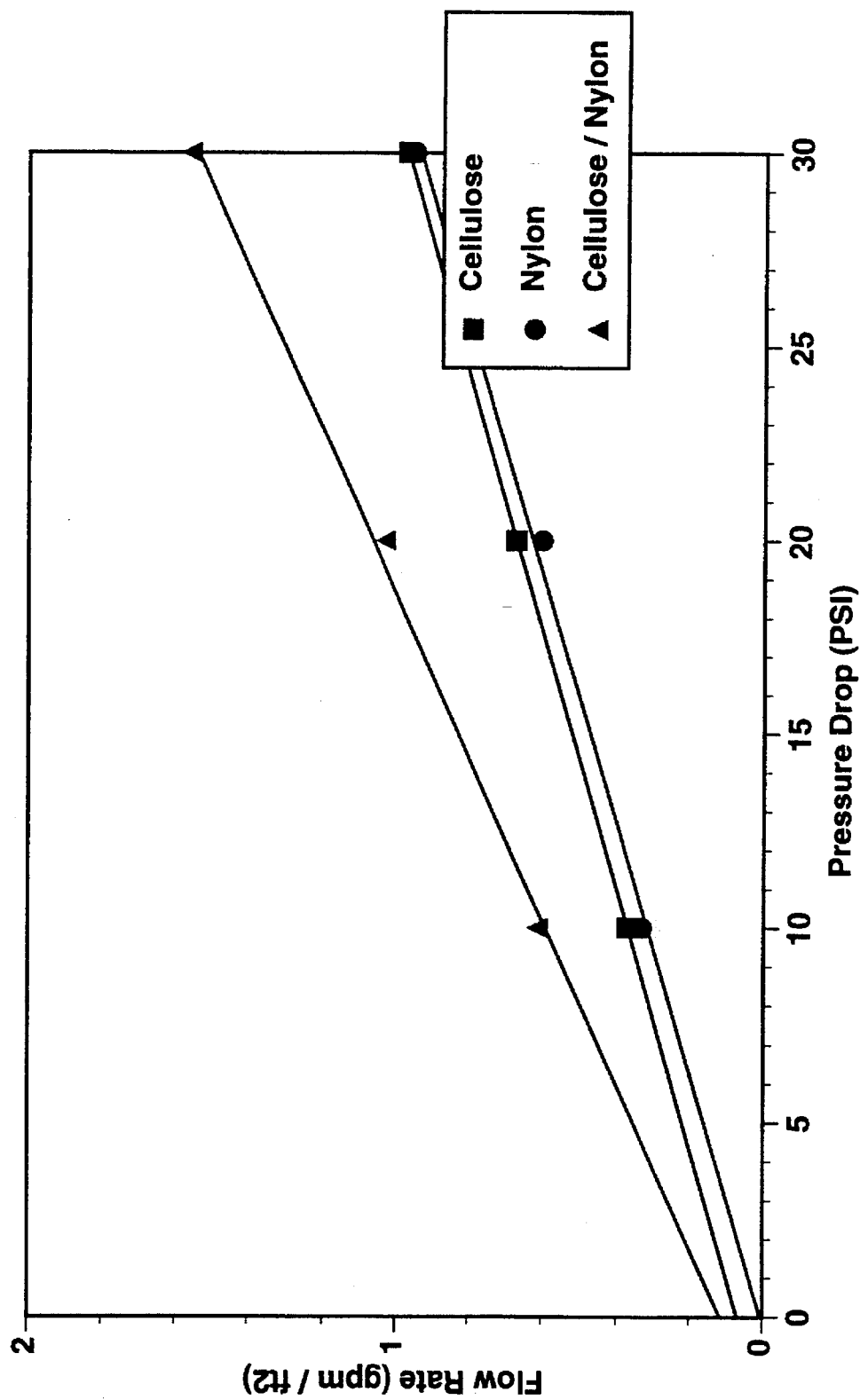
Figure 2. Ecosorb Permeability after Carbon Addition

ADSORBENT FILTER BED WITH PLIANT AND STIFF MEMBERS

This application is a continuation-in-part of U.S. patent Ser. No. 08/002,957, filed on Jan. 11, 1993 (now U.S. Pat. No. 5,346,624)

TECHNICAL FIELD

The present invention relates to an improved filter bed and, also, to a method for separating impurities from a liquid.

BACKGROUND OF THE INVENTION

Relatively thin filter beds, called precoat layers or precoats, are widely utilized to improve the efficiency of mechanical filtration and adsorption. The precoat is deposited on the surface of a porous septum, such as a filter screen, an annular filter cartridge, a tubular filter cartridge, a pleated filter cartridge, a deep or shallow bed, or the like. The precoat enhances removal of contaminant particles from a liquid stream, protects the septum from plugging, and retains the particles on or upstream of the surface of the septum so that the particles can be more easily dislodged by backwashing. These advantages are offset during operation to some extent by an increase in overall pressure differential across the precoat and the septum.

Some water treatment applications require the removal of both dissolved and suspended or colloidal materials. Steam generation of electrical power, in both fossil fuel and nuclear power plants, exemplifies such water treatment applications. In both applications, the recycle stream for the steam turbines is usually passed through a filter bed.

A significant breakthrough in the purification of liquid streams is described in U.S. Pat. Nos. 3,250,702 and 3,250,703, both of which are assigned to the assignee of this application. The invention described in these patents is based on the discovery that, when finely divided anion and cation exchange resin particles are mixed in aqueous suspension, a volume increase is noted. This volume increase is the result of an agglomeration or "clumping" between the anion and cation exchange resin particles. Such resin particles, when used to form a filter bed, produce significantly reduced pressure drops across the bed, together with longer run lengths and improved efficiency of dissolved and undissolved solids removal.

A method for removing impurities from a liquid by passing the liquid through a filter bed which comprises a mixture of oppositely charged particles of filter aid material of oppositely charged particles of filter aid material is described in U.S. Pat. No. 4,177,142, which patent is assigned to the assignee of this application. The filter aid materials are disclosed as including diatomaceous earth, cellulose fibers, charcoal, expanded pearlite, asbestos fibers, ion exchange resins, and inorganic ion exchangers. The filter bed comprises a mixture of oppositely charged particles of filter aid material. The filter aid particles normally have a surface charge in aqueous suspension. A portion of the particles is treated with a chemical compound to produce a surface charge which is opposite to the normal surface charge. A mixture of oppositely charged particles (normal and reversed) is therefore produced, and the "dumping" phenomenon is achieved.

A method for removing impurities from a liquid by passing the liquid through a filter bed which comprises treated filter aid material mixed with finely divided ion exchange resin particles in the size range of 60 to 400 mesh is described in U.S. Pat. No. 4,190,532 which patent is assigned to the assignee of this application. The mixture of treated filter aid material and ion exchange resin particles produces a clumping phenomenon. The filter aid materials include cellulose fibers, diatomaceous earth, charcoal, expanded pearlite, asbestos fibers and polyacrylonitrile fibers. The ion exchange resin particles include cation exchange resins, anion exchange resins or a mixture of both. The filter aid materials are treated with a chemical compound to produce the required surface charge.

A method for removing impurities from a liquid by passing the liquid through a filter bed which comprises a mixture of a treated fibrous filter aid material and an active particulate material is described in U.S. Pat. No. 4,238,334, which patent is assigned to the assignee of this application. The "fibrous filter aid materials" include cellulose fibers, polyacrylonitrile fibers, Teflon fibers, nylon fibers, rayon fibers, polypropylene fibers and polyvinyl chloride fibers.

In U.S. Pat. No. 4,747,955, assigned to the assignee of this invention, there is described a method for removing impurities wherein polyester fibers are used as a filter aid material in precoat filter formulations. The polyester fibers are treated with a hot caustic solution to covert the normally hydrophobic surface of the fibers to a hydrophilic surface.

In U.S. Pat. No. 4,313,832 there is described a method for purifying aqueous solutions by the use of ion exchange fibers. The ion exchange fibers have a thickness in the range of from about 2 to about 200 µm and a length of more than twice the thickness. In order to intertwine the ion exchange fibers into a compact mass, they are mixed with water and stirred thoroughly. The compact mass of fibers is applied as a slurry to a filter support to form a precoat layer thereon. The ion exchange fibers may be cation exchange fibers, anion exchange fibers or a mixture thereof. An alternative embodiment is disclosed wherein the intertwined ion exchange fibers have finely divided ion exchange resin particles of a diameter from about 2 to about 250 µm entrained between the ion exchange fibers.

All known precoats increase the total pressure differential observed across the precoat and the septum during filter operation. Generally, precoats which are relatively more compressible exhibit higher total pressure differentials and greater filtration efficiencies. However, higher pressure differentials consume pumping energy and limit the flow rate of fluid which can be passed through the filter. A need exists for a precoat that provides relatively great filtration efficiency while simultaneously exhibiting a relatively low operating pressure differential.

SUMMARY OF THE INVENTION

The invention provides improved filter beds comprising a mat composed substantially of a mixture of pliant fibers and relatively stiff fibers. The filter beds may additionally include adsorbent particles. The filter beds produce a desirably high separation efficiency for removing contaminants from a liquid while simultaneously exhibiting a relatively low operating pressure differential. The filter beds resist compression yet are capable of removing dissolved and colloidal contaminants. The invention also provides a method for separating impurities from a liquid which utilizes the improved filter beds.

In one embodiment, the invention is a filter bed comprising a mat composed substantially of a mixture that contains about 1 to about 95 dry weight percent of adsorbent. The adsorbent particles can be, for example, activated alumina, adsorptive clay, molecular sieves, ion exchange resins, zirconium oxide or diatomaceous earth. The mixture also contains about 2 to about 89 dry weight percent of pliant fibers and about 2 to about 89 dry weight percent of relatively stiff fibers. The pliant fibers and the stiff fibers each exhibit a modulus of elasticity which is an index of their relative stiffness. Preferably, the pliant fibers have a modulus of elasticity in the range of about 1,000 to about 200,000 pounds per square inch, while the stiff fibers have a modulus of elasticity which is greater than about 200,000 pounds per square inch. The stiff fibers and the pliant fibers have a ratio of moduli of elasticity in the range of about 1 to 1.5 to about 1 to 100.

In another embodiment, the invention is a method for separating impurities from a liquid. The method comprises applying a mixture on an upstream surface of a porous support member, such as a septum, to form a filter bed. The mixture is substantially composed of about 1 to about 95 dry weight percent of adsorbent particles, about 2 to about 89 dry weight percent of pliant particles and about 2 to about 89 dry weight percent of stiff fibers. The pliant fibers have a modulus of elasticity in the range of about 1,000 to about 200,000 pounds per square inch, while the stiff fibers have a modulus of elasticity which is greater than about 200,000 pounds per square inch. An example of impurities which can be removed by the present method is an iron corrosion product, such as may be commonly found in ferrous steam piping systems.

In another embodiment, the invention is a filter bed comprising a mat composed substantially of a mixture that contains about 2 to about 98 dry weight percent of pliant fibers and about 2 to about 98 dry weight percent of relatively stiff fibers. The filter bed may be similarly applied on a septum for separating impurities from a liquid.

DESCRIPTION OF DRAWINGS

FIG. 1 is a graph comparing the permeability of three different fiber mixture precoats at different flow rates.

FIG. 2 is a graph comparing the permeability of the same three fiber mixture precoats as presented in FIG. 1 with one gram of powdered activated carbon applied to each precoat.

DESCRIPTION OF PREFERRED EMBODIMENTS OF THE INVENTION

The present invention is directed to the utilization of a mixture of pliant fibers and stiff fibers, both with and without adsorbent particles, as a filter bed, particularly as a precoat.

In a preferred embodiment, the filter bed comprises a mat formed by a randomly oriented deposition of fibers, preferably deposited by passing a slurry that contains the fibers through a septum having suitably sized pores. Preferably, adsorbent particles are dispersed throughout the mat. The fibers need not be woven or substantially intertwined.

The mixture contains about 1 to about 95 dry weight percent of adsorbent particles, preferably about 20 to about 90 dry weight percent, as determined when the adsorbent particles are saturated with water and permitted to drain briefly. The mixture also contains about 2 to about 89 dry weight percent of relatively pliant fibers, preferably about 5 to about 35 dry weight percent and more preferably about 25 dry weight percent. Additionally, the mixture contains about 2 to about 89 dry weight percent of relatively stiff fibers, preferably about 5 to about 35 dry weight percent and more preferably about 25 dry weight percent. The weights of the particles and the fibers are determined after they have been saturated with water but before a significant amount of water can leave the fibers by evaporation.

A wide variety of active particulate materials may be utilized as the adsorbent particles of the present invention. Examples include activated carbon, activated alumina, activated clays, molecular sieves, zirconium oxides, and ion exchange resins. Of these, ion exchange resins, activated carbon and adsorptive clays, such as bentonite and kaolin, are preferred. Preferably, the adsorptive particles are in spheroidal or granular form. The adsorbent particles preferably have a median average effective diameter of about 0.5 to about 100 microns, more preferably about 5 to about 80 microns.

The pliant fibers are, for example, composed substantially of cellulose, wool, polypropylene, low density polyethylene, polyvinyl acetate, cellulose acetate or polytetrafluoroethylene. Of these, cellulose is presently preferred. Cellulose fiber, which is available commercially under the trade name Solka-Floc, is especially preferred for use as the pliant fiber. The pliant fibers have a median average length of about 20 to about 3,000 microns, more preferably, about 100 to about 500 microns. Pliant fibers having an aspect ratio which is in the range of about 2 to about 500 are recommended.

The stiff fibers are relatively more rigid than the pliant fibers. The stiff fibers can be straight or crimped, having a continuous wavy, curly or jagged character along their length. For example, the stiff fibers can be substantially composed of synthetic polymers, carbon or stainless steel. Preferably, the stiff fibers are composed substantially of a synthetic polymer such as polyester, nylon, acrylic, polysulfone, polyamide or a divinylbenzenestyrene copolymer. The stiff fibers can be formed by melt-blowing.

Preferred stiff fibers include thermoformable polymers such as high density polyethylene, polypropylene, poly-1-butene, polystyrene, polyalpha-methylstyrene, methylalphachlorostyrene, copolymers of vinyl chloride and vinyl acetate, partially hydrolyzed copolymers of vinyl chloride and vinyl acetate, polyvinylpyrrolidone, polyacrylonitrile, copolymers of N-vinylpyrrolidone and vinyl acetate, copolymers of vinylmethylketone and vinyl chloride, vinyl acetate or N-vinylpyrrolidone, polymethylmethacrylate, polymethacrolein, diethylacetal of polyacrolein, copolymers of styrene and acrylonitrile, nylon (such as polyhexamethyleneadipate, polytetramethylenesebacamide, and polypyrrolidone), the polyimidazolines polyesters (such as polyethyleneterephthalate, poly-1,4-cylclohexyleneterephthalate, and the like), oxymethylene homopolymers and copolymers (the formaldehyde polymers), polycarbonates such as the reaction product of phosgene or monomeric carbonate esters with bisphenol A, and ion exchange fibers (such as Ionex from Toray Industries, Inc. of Tokyo, Japan, Nitivy Ion Exchange Fiber from Nitivy of Tokyo, Japan, and A4-C from Japan Organo of Tokyo, Japan) and the like. Presently, the most preferred stiff fiber materials are acrylate, nylon, polyacrylonitrile and ion exchange fibers.

Whatever the material employed to form the stiff fibers, the stiff fibers must be relatively more rigid than the pliant fibers present in a particular filter bed. Preferably the stiff fibers have a modulus of elasticity which is treater than about 200,000 pounds per square inch, more preferably in the range of about 200,000 to about 600,000.

It is useful to express the relationship of the rigidity of the pliant fibers to the stiff fibers in terms of a ratio of their respective moduli of elasticity. Accordingly, it is preferred that the ratio of the tensile moduli of the fibers to the pliant fibers be in the range of about 1.5 to about 100.

The stiff fibers and/or the pliant fibers are preferably treated with a polyelectrolyte to produce a clumping phenomenon in accordance with the teachings of U.S. Pat. No. 4,190,532, the disclosure of which patent is incorporated herein by reference.

It is hypothesized that the inclusion of pliant fibers and stiff fibers, exhibiting a ratio of moduli of elasticity within the specified range provides a filter bed which is sufficiently open to exhibit a desirably low pressure differential during operation, yet sufficiently compressible to demonstrate useful filtration efficiency. Traditional filter beds fashioned from a single type of fiber generally resist compression at the expense of filtration efficiency, or alternatively, collapse under the influence of hydraulic pressure differential and produce an unacceptably high pressure drop.

The filter bed of the present invention preferably operates as a partially open mat which resists further compression. It is believed that a mixture of pliant fibers and stiff fibers having a ratio of moduli of elasticity in the preferred range produces a useful bridging phenomenon which stabilizes the mixture and resists compression by hydraulic pressure differentials. It is theorized that the presence of adsorptive particles interacts synergistically with the fibers to further stabilize the mat.

In another embodiment, the invention is a method for separating impurities from a liquid. The method comprises applying a mixture on an upstream surface of a porous support member, such as a septum, to form a filter bed. The mixture is substantially composed of about 1 to about 95 weight percent adsorbent particles as described above. The mixture also preferably includes about 2 to about 89 weight percent pliant fibers having a modulus of elasticity in the range of about 1,000 to about 200,000. Relatively stiff fibers are present in the mixture in an amount of about 2 to about 89 percent, based upon the total weight of the filter bed, as determined when the filter bed has been saturated with water and briefly drained. A liquid contaminated with impurities is passed through the filter bed to separate the impurities from the liquid, thereby producing a relatively pure liquid stream.

The following example is presented to further communicate the invention, and is not intended to limit the scope of the invention in any way.

EXAMPLE I

Three different fiber mixture precoats were prepared using the process as described in U.S. Pat. No. 4,238,334. In each instance 30 dry grams of fiber were sequentially mixed with 70 ml of 8.5% slurry of powdered anion exchange resin of approximately 5–10 micron particle size, 70 grams of powdered activated carbon, and 70 ml of 0.1% solution of Magnifloc (a polyelectrolyte manufactured by American Cyanamid). The first precoat comprised 30 dry grams of BH-20 cellulose fibers (manufactured by International Filter Corporation). The second precoat comprised 30 dry grams of 31WNF nylon fibers (manufactured by International Filter Corporation). The third precoat comprised 15 dry grams of each of the above identified cellulose and nylon fibers. Each of the precoats was applied to a filter element with a 0.038 ft.$^2$ surface area at a rate of 0.25 dry lb./ft.$^2$. A sugar solution of 65 brix at a temperature of 82° C. was passed through the filter elements at three different flow rates. The permeability was measured at each flow rate as shown in FIG. 1.

EXAMPLE II

In order to determine the impact of solids on flow rate and thereby determine resistance to plugging of each of the precoats, the above tests were repeated with one gram of powdered activated carbon applied to each precoat. The permeability was measured at each flow rate as shown in FIG. 2.

From the above, it is unexpectedly demonstrated that a precoat containing a mixture of fibers in accordance with the invention gives a higher permeability than precoats containing either fiber alone. This indicates that there is apparently some synergistic interaction between the pliant fibers and the stiff fibers as described above. The higher permeability of the mixed pliant/stiff fiber precoat will result in higher productivity and longer precoat run length (to a pressure endpoint) than formulations based on a single fiber.

In another embodiment, the filter bed comprises a mat formed by a randomly oriented deposition of pliant fibers and stiff fibers. The mixture contains about 2 to about 98 weight percent of pliant fibers and about 2 to about 98 weight percent of stiff fibers. The filter bed is formulated as discussed above except that the filter bed is substantially devoid of adsorbent particles. It is contemplated that the filter bed may be similarly applied on a septum for separating impurities from a liquid as discussed above.

The Examples and theories set forth above are provided to communicate the invention, and do not limit the subject matter of the appended claims. The teachings of all patents incorporated by reference herein are incorporated in their entirety. Many modifications and variations of the invention as hereinbefore set forth will occur to those skilled in the art upon reading this description, and it is intended to cover in the appended claims all such modifications and variations as fall within the true spirit and scope of the invention.

What is claimed is:

1. A precoat filter bed comprising a mat composed substantially of a mixture which comprises:

about 1 to about 95 weight percent adsorbent particles;

about 2 to about 89 weight percent pliant fibers; and about 2 to about 89 weight percent relatively stiff fibers based on the total weight of the filter bed;

said stiff fibers and said pliant fibers having a ratio of moduli of elasticity in the range of about 1.5 to about 100;

said mixture of adsorbent particles, pliant fibers and stiff fibers producing a clumping phenomenon.

2. The filter bed of claim 1 wherein said pliant fibers and said stiff fibers have a median average length of about 20 to about 3,000 microns, respectively.

3. The filter bed of claim 1 wherein said pliant fibers and said stiff fibers have a median average aspect ratio of about 2 to about 500 respectively.

4. The filter bed of claim I wherein said adsorbent particles have a median average effective diameter of about 0.5 to about 100 microns.

5. The filter bed of claim 1 wherein said pliant fibers are a member selected from the group consisting of cellulose, wool, cellulose acetate, polyethylene, low density polypropylene, and polytetrafluoroethylene.

6. The filter bed of claim 1 wherein said stiff fibers are a member selected from the group consisting of nylon, polyester, acrylic polymers, carbon, styrene-divinylbenzene polymers, polycarbonates, polyimides, polyaramid, polyaerylonitrile, high density polyethylene and stainless steel.

7. The filter bed of claim 1 wherein said adsorbent particles are a member selected from a group consisting of activated carbon, activated alumina, adsorptive clay, molecule sieves, zirconium oxide and ion exchange resin.

8. A precoat filter bed comprising a mat composed substantially of a mixture which comprises:

about 2 to about 98 weight percent pliant fibers; and about 2 to about 98 weight percent relatively stiff fibers based on the total weight of the filter bed;

said stiff fibers and said pliant fibers having a ratio of moduli of elasticity in the range of about 1.5 to about 100;

said mixture of pliant fibers and stiff fibers producing a clumping phenomenon.

9. The filter bed of claim 8 wherein said pliant fibers and said stiff fibers have a median average length of about 20 to about 3,000 microns, respectively.

10. The filter bed of claim 8 wherein said pliant fibers and said stiff fibers have a median average aspect ratio of about 2 to about 500 respectively.

11. The filter bed of claim 8 wherein said adsorbent particles have a median average effective diameter of about 0.5 to about 100 microns.

12. The filter bed of claim 8 wherein said pliant fibers are a member selected from the group consisting of cellulose, wool, cellulose acetate, polyethylene, polypropylene, and polytetrafluoroethylene.

13. The filter bed of claim 8 wherein said stiff fibers are a member selected from the group consisting of nylon, polyester, acrylic polymers, carbon, styrene-divinylbenzene polymers, polycarbonates, polyimides and stainless steel.

* * * * *